US007782474B2

(12) United States Patent
Nakagawa

(10) Patent No.: US 7,782,474 B2
(45) Date of Patent: Aug. 24, 2010

(54) JOB MANAGING APPARATUS AND METHOD, JOB MANAGING PROGRAM, STORAGE MEDIUM STORING THE PROGRAM, AND JOB MANAGING SYSTEM

(75) Inventor: Isamu Nakagawa, Fujisawa (JP)

(73) Assignee: Canon Kabushiki Kaisha (JP)

( * ) Notice: Subject to any disclaimer, the term of this patent is extended or adjusted under 35 U.S.C. 154(b) by 1155 days.

(21) Appl. No.: 11/086,479

(22) Filed: Mar. 22, 2005

(65) Prior Publication Data

US 2005/0219612 A1 Oct. 6, 2005

(30) Foreign Application Priority Data

Mar. 30, 2004 (JP) ............... 2004-100618

(51) Int. Cl.
*G06F 3/12* (2006.01)
(52) U.S. Cl. .................... 358/1.15; 358/1.13; 358/1.14; 358/1.1
(58) Field of Classification Search ................ 358/1.15, 358/1.14, 1.13
See application file for complete search history.

(56) References Cited

U.S. PATENT DOCUMENTS 6,622,266 B1 9/2003 Goddard et al.

| 2001/0056406 | A1* | 12/2001 | Nagoya et al. ................. 705/52 |
| 2002/0105671 | A1* | 8/2002 | Sugahara ................... 358/1.15 |
| 2003/0172148 | A1 | 9/2003 | Simpson et al. |
| 2003/0210417 | A1* | 11/2003 | Haltmeyer et al. ......... 358/1.13 |
| 2003/0222396 | A1 | 12/2003 | Kurahashi et al. |
| 2004/0042030 | A1* | 3/2004 | Endoh et al. ................ 358/1.14 |
| 2005/0018242 | A1* | 1/2005 | Azami ....................... 358/1.15 |
| 2005/0210129 | A1* | 9/2005 | Feng et al. .................. 709/224 |
| 2005/0275876 | A1* | 12/2005 | McLean et al. ............. 358/1.15 |

FOREIGN PATENT DOCUMENTS

| JP | 2001-067195 A | 3/2001 |
| JP | 2001-282475 A | 10/2001 |
| JP | 2003-244778 A | 8/2003 |
| JP | 2003-266892 A | 9/2003 |
| JP | 2004-029128 A | 1/2004 |

* cited by examiner

*Primary Examiner*—Twyler L Haskins
*Assistant Examiner*—Kent Yip
(74) *Attorney, Agent, or Firm*—Rossi, Kimms & McDowell LLP

(57) ABSTRACT

A job managing apparatus in which a message can be displayed without installing a job account client application in a print client. A print server manages a job that is output to a printer and transmits information related to the job to a print client. The information related to the job is transmitted to an application for notifying a user of the information related to the job when the print client has the application. When the print client does not have the application, the information related to the job is transmitted to an operating system of the print client.

24 Claims, 12 Drawing Sheets

FIG. 2

| JOB ID | 520 |
|---|---|
| OWNER NAME | YAMADA |
| JOB NAME | CONFIDENTIAL INFORMATION.txt |
| DATA SIZE | 56789 |
| NUMBER OF SIDES | 3 |
| NUMBER OF SHEETS | 2 |
| BOTH/SINGLE | DOUBLE SIDED |
| PAPER TYPE | PLAIN PAPER |
| NUP | 4 |
| TYPE | PORT MONITOR |
| START TIME | 2001/12/20 21:31 |
| END TIME | 2001/12/20 21:41 |
| PRINT CLIENT | USER COMPUTER 001 |

FIG. 9

| COMPUTER NAME | IP ADDRESS | VERSION |
|---|---|---|
| Jan | 10.168.30.01 | 1.00 |
| Feb | 10.168.30.02 | 1.01 |
| Mar | 10.168.30.03 | 1.00 |

FIG. 11

YAMADA ▽

【UPPER LIMIT LIMITATION】

| | | |
|---|---|---|
| UNIT PERIOD : | 1 MONTH | 1101 |
| START DATE : | 5 DAYS | 1102 |
| UPPER LIMIT : | 300 SIDES | 1103 |
| DELETE JOB EXCEEDING UPPER LIMIT : | YES | 1104 |
| WARN JOB EXCEEDING UPPER LIMIT : | YES | 1105 |

【DOCUMENT NAME LIMITATION】 1106    1107

CHARACTER STRING(S) TO BE LIMITED IN DOCUMENT NAME :
- CONFIDENTIAL
- SECRET
- PRINTING PROHIBITED

ADD
DELETE 1108

DELETE JOB INCL. LIMITING CHARACTER STRING : NO 1109

WARN JOB INCL. LIMITING CHARACTER STRING : YES 1110

OK 1111     CANCEL 1112

JOB MANAGING APPARATUS AND METHOD, JOB MANAGING PROGRAM, STORAGE MEDIUM STORING THE PROGRAM, AND JOB MANAGING SYSTEM

BACKGROUND OF THE INVENTION

1. Field of the Invention

The present invention relates to a job managing apparatus and method, a job managing program, a storage medium storing the program, and a job managing system. Specifically, the present invention relates to a job managing apparatus, such as a server computer that manages jobs transmitted to peripheral devices by a client computer and a method therefor, a job managing program, a storage medium storing the program, and a job managing system.

2. Description of the Related Art

Conventional job managing systems are comprised of peripheral devices such as printers, scanners, copying machines, or multi-function devices (MFP) integrating those peripheral devices therein, client computers that transmit jobs to the peripheral devices, and a job managing apparatus that carries out job management of job data acquisition performed by the peripheral devices and job output control managing (refer to Japanese Laid-Open Patent Publication (Kokai) No. 2001-282475 and Japanese Laid-Open Patent Publication (Kokai) No. 2003-244778, for example).

The conventional job managing system comprises, for example, a print client 10, a print server 30, a server computer 40, and a printer 50, which are connected together via a network 60, as shown in FIG. 13.

The print client 10 has installed therein job account client application 11 and an application 12. These programs 11 and 12 are stored in a RAM provided in the print client 10. The CPU 201 executes the programs to perform processes shown in figures, hereinafter referred to. Further, the print client 10 is comprised of a GDI (graphics drawing processing subsystem) 13, a print driver 14, an output selector 15, a spooler 16, and a port monitor 17.

The print server 30 is basically the same in construction as the print client 10, and like component elements (for example, GDI 13 and GDI 33) of the print server 20 are designated by identical reference numerals in FIG. 13. The server computer 40 has a job account server application 41 installed therein.

The job account client application 11 issues a printing instruction for the application 12, which makes a GDI call for the GDI 13 to carry out graphics drawing. In response to the GDI call, the GDI 13 calls the print driver 14, which in turn converts the GDI call into PDL data and transmits the PDL data to the output selector 15. The output selector 15 transmits job data to the spooler 16 (or a spooler 36).

The spooler 16 accumulates the job data received from the output selector 15 and sequentially sends the same to the port monitor 17. The port monitor 17 receives the data from the spooler 16, and if the printer 50 is in a state where it can receive the job data, then it sends the job data to the printer 50, according to a job transmission method employed by the device.

As the job transfer method, there are known a LPD protocol regulated stipulated by RFC 1179 and a Printer Job Language (registered trademark) stipulated by Hewlett-Packard USA. With the Printer Job Language, a port monitor can acquire the number of pages of a job which is completed, through two-way communication with the printer.

As described above, besides the construction in which the computer indicating printing to the printer 50 is identical with the computer transmitting job data to the printer 50, there has been generally used a construction in which queuing of job data and transmission of the same are both carried out by the print server 30. In this case, the print server 30 receives a job data transmission request from the print client 10, queues the job data in the spooler 36, and transmits the job data to the printer 50 through a port monitor 37.

Further, the job account server application 41 sets in advance the upper limit of the number of pages or sides to be output in a unit time period on a user-by-user basis or on a section-by-section basis. When the number of output pages in the received job data exceeds the upper limit, the job account client application 31 can cancel the printing or carry out upper limit control processing by showing a warning message on a display of the print client 10. This warning message is shown on the display of the print client 10 by the job account client application 11.

However, in the above job managing system, to display the warning message in the print client 10 display, it is necessary to install the job account client application 11 in the print client 10. Therefore, when the job account client application 11 is not installed in the print client 10, the warning message cannot be displayed.

SUMMARY OF THE INVENTION

It is an object of the present invention to provide a job managing apparatus and method and a job managing program, and a job managing system in which a message can be displayed without installing a job account client application in a print client, and a storage medium storing the program.

To attain the above object, in a first aspect of the present invention, there is provided a job managing apparatus that manages a job that is output to a peripheral device via a communication medium and transmits information related to the job to an information processing apparatus, comprising a transmission unit that transmits the information related to the job to an application for notifying a user of the information related to the job when the information processing apparatus has the application, and transmits the information related to the job to an operating system of the information processing apparatus when the information processing apparatus does not have the application.

According to the construction mentioned above, information is transmitted to the application when the information processing apparatus has the application, and information is transmitted to the operating system (OS) of the information processing apparatus when the information processing apparatus does not have the application. As a result, a message can be displayed without installing the job account client application in the print client.

Preferably, the job managing apparatus further comprises a determining unit that determines whether or not the information processing apparatus has the application for notifying the user of the information related to the job, and a registering unit that registers the information processing apparatus having the application, and the determining unit determines whether or not the information processing apparatus has the application by determining whether or not the information processing apparatus has been registered by the registering unit.

More preferably, the job managing apparatus further comprises a connecting unit that is connectable to the application, and the determining unit determines whether or not the information processing apparatus has the application by determining whether or not the connecting unit has been successfully connected to the application.

Preferably, the job managing apparatus further comprises a setting unit that sets an upper limit of an output amount of the job output by the peripheral device, and a limiting unit that limits the peripheral device from outputting over the upper limit of the output amount.

More preferably, the upper limit of the output amount includes at least one of upper limit values per unit period relating to number of pages, number of sides, and charges.

Preferably, the job managing apparatus further comprises a second setting unit that sets at least one attribute of the job, and a second limiting unit that limits output of a job having the attribute.

More preferably, the attribute comprises at least one specific character string contained in a document name of the job.

More preferably, the job managing apparatus further comprises a third setting unit that sets whether or not the job, output of which is to be limited, is to be deleted.

More preferably, the job managing apparatus further comprises a fourth setting unit that sets whether or not a warning is to be given regarding the job, output of which is to be limited.

To attain the above object, in a second aspect of the present invention, there is provided a job managing method of managing a job that is output to a peripheral device via a communication medium, and transmitting information related to the job to an information processing apparatus, comprising a transmitting step of transmitting the information related to the job to an application for notifying a user of the information related to the job when the information processing apparatus has the application, and transmitting the information related to the job to an operating system of the information processing apparatus when the information processing apparatus does not have the application.

To attain the above object, in a third aspect of the present invention, there is provided a job managing program that is executable by a computer to manage a job that is output to a peripheral device via a communication medium and transmit information related to the job to an information processing apparatus, comprising a transmission module for transmitting the information related to the job to an application for notifying a user of the information related to the job when the information processing apparatus has the application, and transmitting the information related to the job to an operating system of the information processing apparatus when the information processing apparatus does not have the application.

Preferably, the job managing program causes a computer to execute a determining module for determining whether or not the information processing apparatus has an application for notifying the user of the information related to the job, and a registering module for registering the information processing apparatus having the application, and the determining module determines whether or not the information processing apparatus has the application by determining whether or not the information processing apparatus has been registered by the registering module.

More preferably, the job managing program further comprises a connection module that is connectable to the application, and the determining module determines whether or not the information processing apparatus has the application by determining whether or not the connecting unit has been successfully connected to the application.

Preferably, the job managing program further comprises a setting module for setting an upper limit of an output amount of the job output by the peripheral device, and a limiting module for limiting the peripheral device from outputting over the upper limit of the output amount.

More preferably, the upper limit of the output amount includes at least one of upper limit values per unit period relating to number of pages, number of sides, and charges.

Preferably, the job managing program further comprises a second setting module for setting at least one attribute of the job, and a second limiting module for limiting output of a job having the attribute.

More preferably, the attribute comprises at least one specific character string contained in a document name of the job.

Preferably, the job managing program further comprises a third setting module for setting whether or not the job, output of which is to be limited, is to be deleted.

Preferably, the job managing program further comprises a fourth setting module for setting whether or not a warning is to be given regarding the job, output of which is to be limited.

To attain the above object, in a fourth aspect of the present invention, there is provided a readable storage medium that stores a job managing program as claimed in any of claims 11 to 19.

To attain the above object, in a fifth aspect of the present invention, there is provided a job managing system comprising an information processing apparatus that notifies a user of information, and a job managing apparatus that manages a job that is output to a peripheral device via a communication medium and transmits information related to the job to the information processing apparatus, the job managing apparatus includes a transmission unit that transmits the information related to the job to an application for notifying the user of the information related to the job when the information processing apparatus has the application, and transmits the information related to the job to an operating system of the information processing apparatus when the information processing apparatus does not have the application, and the information processing apparatus includes a notification unit that notifies the user of the information transmitted by the transmission unit.

To attain the above object, in a sixth aspect of the present invention, there is provided a status notification method for a system comprising at least one peripheral device, and an information processing apparatus that notifies a user of a status of the peripheral device, comprising a determining step of causing the peripheral device to determine whether or not the information processing apparatus has an application for notifying the user of the status, and a transmission step of causing the peripheral device to transmit the status to the application when it is determined in the determining step that the information processing apparatus has the application, and causing the peripheral device to transmit the status to an operating system of the information processing apparatus when it is determined in the determining step that that the information processing apparatus does not have the application.

The above and other objects, features, and advantages of the invention will become more apparent from the following detailed description taken in conjunction with the accompanying drawings.

BRIEF DESCRIPTION OF THE DRAWINGS

FIG. 2 is a diagram showing an example of a port monitor log obtained by a job account client application appearing in FIG. 1;

FIG. 9 is a diagram showing an example of a client list obtained in a step S802 in FIG. 8;

FIG. 11 is a diagram showing a user interface (UI) for setting output limitation information in the job account server application in FIG. 1;

DETAILED DESCRIPTION OF THE PREFERRED EMBODIMENTS

The present invention will now be described in detail below with reference to the drawings showing a preferred embodiment thereof.

Figure 1:
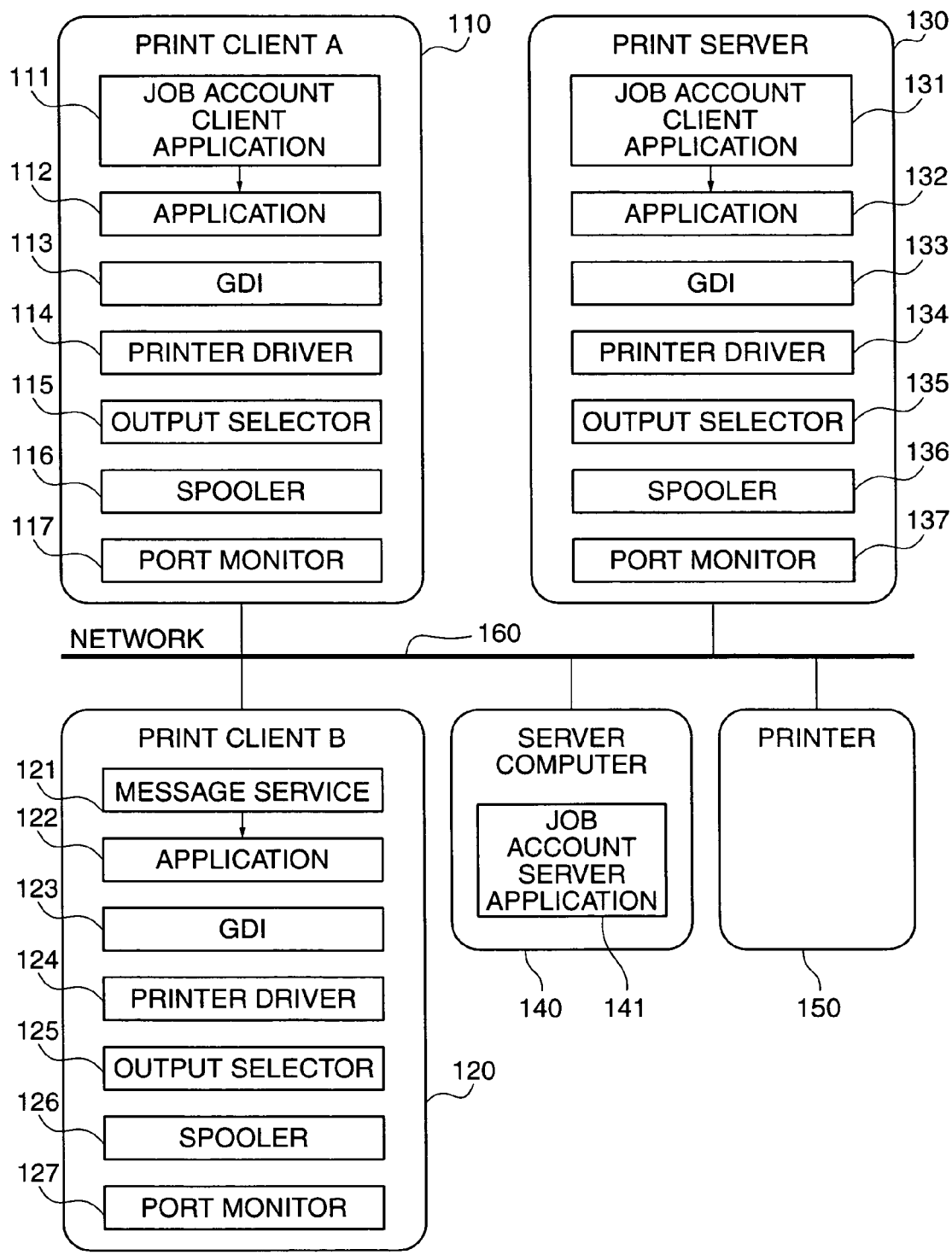
FIG. 1 is a block diagram schematically showing the construction of a job managing system according to an embodiment of the present invention.

FIG. 1 is a block diagram schematically showing the construction of a job managing system according to an embodiment of the present invention.

As shown in FIG. 1, the job managing system according to the present embodiment is comprised of a print client A 110 and a print client B 120 (information processing apparatus) that instruct printing, a print server 130 (job managing apparatus) having a print server function for receiving job data from a print client and sequentially transmitting the same to a printer 150 (peripheral device), a server computer 140 that performs output quantity counting processing and registration processing for devices and users, the printer 150 that receives job data and carries out printing, and a network 160 through which all of these components are connected together.

The print client A 110 has a job account client application 111 and an application 112 installed therein. Further, the print client A 110 is comprised of a GDI (Graphics Device Interface) 113, a printer driver 114, an output selector 115, a spooler 116, and a port monitor 117.

The job account client application 111 carries out various processes for implementing a job account including job log acquisition processing, upper limit control (restriction) processing, and communication processing for communicating with a job account server application and communication processing.

The print client B 120 is basically the same in construction as the print client A 110, except that a job account client application is not installed therein, and like component elements are designated by identical reference numerals with the same last digits (for example, GDI 113 and GDI 123). Both the print client A 110 and the print client B 120 include a message service 121, which is included in an operating system (OS) and has a function of displaying received messages from another computer connected to the network. However, this is not shown in the print client A 110, because it is not related to processing carried out by the print client A 110.

The print server 130 is basically the same as the print client A 110 and like component elements are designated by identical reference numerals with the same last digits (for example, GDI 113 and GDI 133). Further, a job account server application 141 is installed in the server computer 140.

The print client A 110 performs Peer-To-Peer printing (hereinafter referred to as "the PTP printing") where printing is carried out by the printer 150 through the port monitor 117, and shared printer printing where printing is carried out by the printer 150 through the print server 130. The PTP Printing has a great degree of freedom in protocol specification, etc., but requires much management time and labor, whereas the shared printer printing requires only one printer server to establish connection with a printer and hence requires reduced management time and labor.

A description will be now given of the job log acquisition processing that is carried out by the print client A 110 at the time of printing.

The job account client application 111 issues a printing instruction to the application 112, which then carries out a GDI call for drawing to the GDI 113. The job account client application 111 hooks the GDI call, then stores information indicative of which GDI call has been made using what parameter, and the number of times GDI calls have been made. For example, the application 111 obtains the number of discharged sheets or the number of pages of a job issued by the application by counting an API (Application Program Interface) that executes repagination or sheet discharge. A job log prepared from the information thus obtained will be referred to as the hook log. The GDI 113 calls the print driver 114 according to the GDI call.

The print driver 114 converts the GDI call into PDL (Page Description Language) data according to printing settings, transmits the PDL data to the output selector 115, extracts job information from the PDL data, and notifies the job account client application 111 of the job information. A job log prepared from this job data will be referred to as the driver log.

The output selector 115 provides the same interface for both the PTP printing and the shared printer printing, transmits the job data to the spooler 116 in the PTP printing, or transmits the job data to a spooler 136 of the print server 130 in the shared printer printing.

The job account client application 111 periodically checks whether or not job data is spooled in the spooler 116, and if it is spooled, issues an API determined by the OS and obtains printing information such as the number of discharged sheets of the job or the number of pages of the job. A job log prepared from this printing information will be referred to as the spooler log.

The spooler 116 queues the job data and transmits the same to the port monitor 117 as required. The port monitor 117 communicates with the printer 150, and if the printer 150 can receive data, the port monitor 117 transmits the job data to the printer 150. Further, the port monitor 117 generates a job log by analyzing the job data and sends the same to the job account client application 111. This job log will be referred to as the port monitor log (FIG. 2).

The port monitor log, as shown in FIG. 2, is comprised of information related to a job including a job ID among job IDs that are consecutively assigned in ascending order by the spooler 116, an owner name indicating the name of the printing party, the size of job data transmitted to the printer 150, the number of sides, and NUP (N-up Printing).

The number of sides is counted at the time of printing on one side of a sheet. The number of sides is set to 1 when printing on one side of a sheet and set to 2 when printing on both sides. NUP indicates how many logical pages are laid out on one side of a sheet.

The job account client application 111 transmits any of the above-mentioned hook log, driver log, spooler log, or port monitor log to the job account server application 141. However, in shared printer printing, transmission is not performed because the print server can acquire the job log. Alternatively, when it is determined that shared printer printing is to be performed, the job log acquisition processing of the printing job may be cancelled.

When receiving a job log, the job account server application 141 executes counting processing of output side number calculation, output sheet number calculation, etc. for each unit period, each device, and each job issuer, etc.

Processing performed by the print client B 120 is the same as the processing by the print client A 110, except that a job account client application is not installed in the former.

Next, a description will be given of processing performed by the print server 130.

Processing when the PTP printing is carried out by the print server 130 is the same as the processing carried out by the print client A 110. In the shared printer printing, the spooler 136 receives printing data from another PC on the network, queues the same, and then sequentially transmits the queued data to a port monitor 137, which in turn communicates with the printer 150 and transmits the data if the printer 150 can receive data.

Job log acquisition processing performed by the print server 130 is substantially the same as the above-described job log acquisition processing by the print client A 110, but since the application operates on the client side, the hook log cannot be obtained. When the GDI call is converted into PDL data on the client side, the driver log cannot be acquired, but when the GDI call is received from the print client before being converted into PDL data, the driver log can be acquired by the print server 130.

The job account server application 141 of the server computer 140 mainly carries out storage of the job log, counting of the output amount by referring to the stored job log, provision of a user interface for the user, registration processing for devices and users, output control, and other setting processes, etc.

The respective computers of the print client A 110, the print client B 120, the print server 130, and the server 140 are the same in interior construction. The interior construction of the print client A 110 will be described below as an example.

Figure 3:
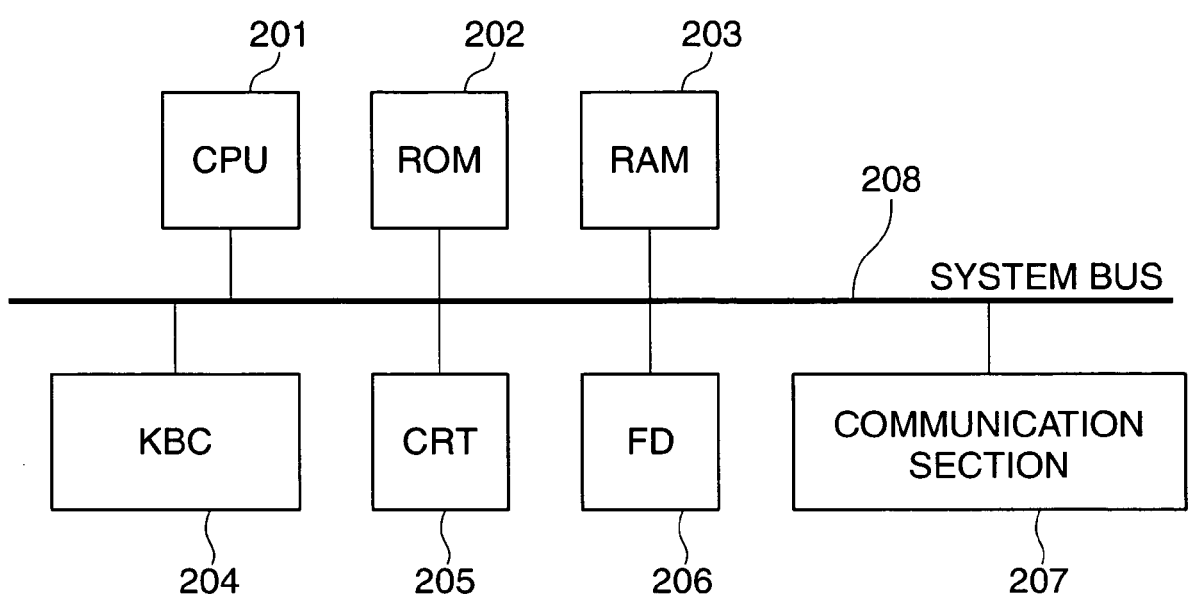
FIG. 3 is a block diagram showing the interior construction of a print client A appearing in FIG. 1.

FIG. 3 is a block diagram showing the interior construction of the print client A 110 in FIG. 1.

As shown in FIG. 3, the print client A 110 is comprised of a CPU 201 that controls the entire print client A 110 and carries out arithmetic operations, etc., a ROM 202 that is used as a storage area for system startup program information, etc., a RAM 203 that is used as a data storage area with no use limitations and is loaded with an OS, applications, and programs for controlling device drivers and communications, the RAM 203 being used as a working area for executing these programs, a KBC (keyboard controller) 204 that transmits data input from a keyboard to the CPU 201, a CRT (display controller) 205 that controls display of a display device, a Floppy Disk (Registered trademark) 206 that is used as an external storage device that stores programs and data referred to or loaded into the RAM 203 as needed when the programs are executed, and a communication section 207 that performs network communication control of other computers and peripheral devices connected thereto through the network. These components are connected together through a system bus 208. The FD 206 may be replaced by a hard disk or a SRAM (nonvolatile storage device).

Figure 4:
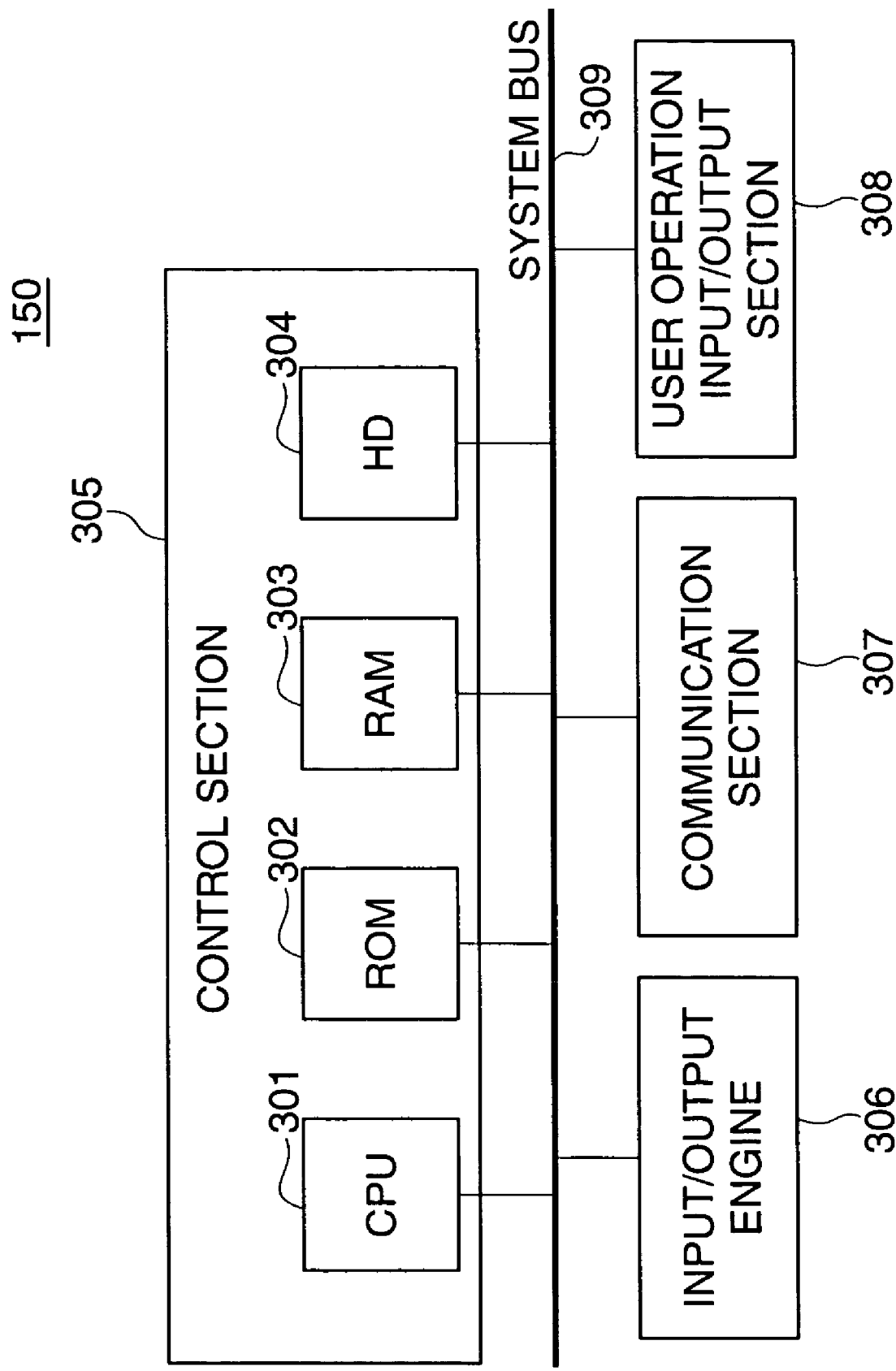
FIG. 4 is a block diagram showing the interior construction of a printer appearing in FIG. 1.

FIG. 4 is a block diagram showing the interior construction of the printer 150 in FIG. 1.

As shown in FIG. 4, the printer 150 is comprised of a controller 305 that controls the entire printer 150, an input/output engine 306 that performs printing operations and image reading operations under the control of the controller 305, a communication section 307 that controls network communications with the print clients and the print server, and a user operation input/output section 308 that performs interactive setting operations with a user.

The controller 305 is comprised of a CPU 301 that performs control of the controller 305 and arithmetic operations, etc., a ROM 302 that is used as a storage area for system startup program information, etc., a RAM 303 that is used as a data storage area with no use limitations and is loaded with an OS, programs for controlling communications and controlling the engine, the RAM 303 being used as a working area for executing these programs, and a HD (hard disk) 304 as a nonvolatile storage device. The SRAM may be replaced by the HD 304.

The components in the controller 305, the input/output engine 306, the communication section 307, and the user operation input/output section 308 are connected together through a system bus 309.

Figure 5:
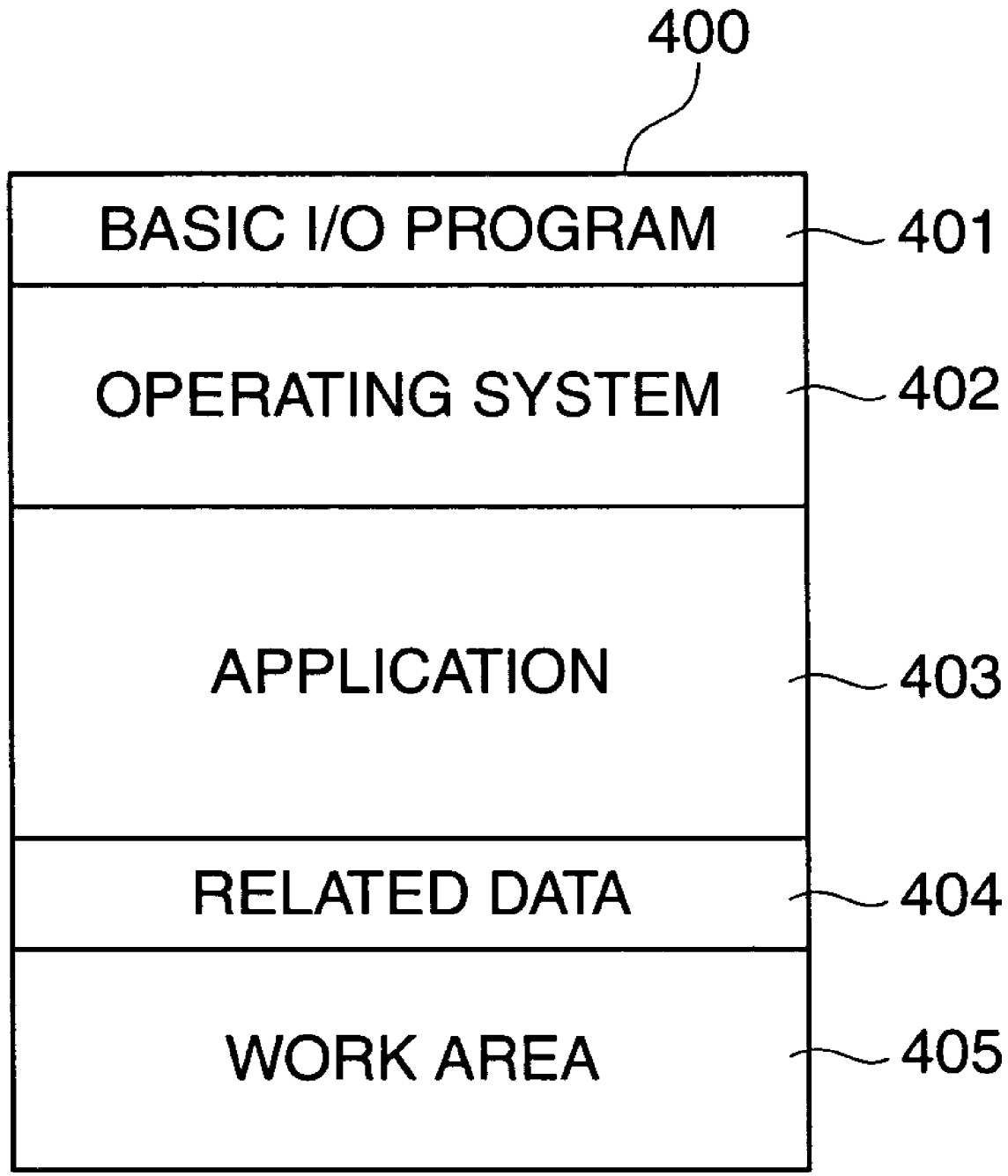
FIG. 5 is a diagram showing the structure of a memory map loaded in a RAM appearing in FIG. 3.

FIG. 5 is a diagram showing the structure of a memory map 400 loaded in the RAM 203 in FIG. 3.

As shown in FIG. 5, the memory map 400 is comprised of a basic I/O program 401, an OS 402 such as a windows system, an application 403 as a job managing program that forms a feature of the present embodiment, related data 404, and a work area 405 used by these programs.

In the present embodiment, the application 403 and the related data 404 are stored in a Floppy Disk (registered trademark) FD.

Figure 6:
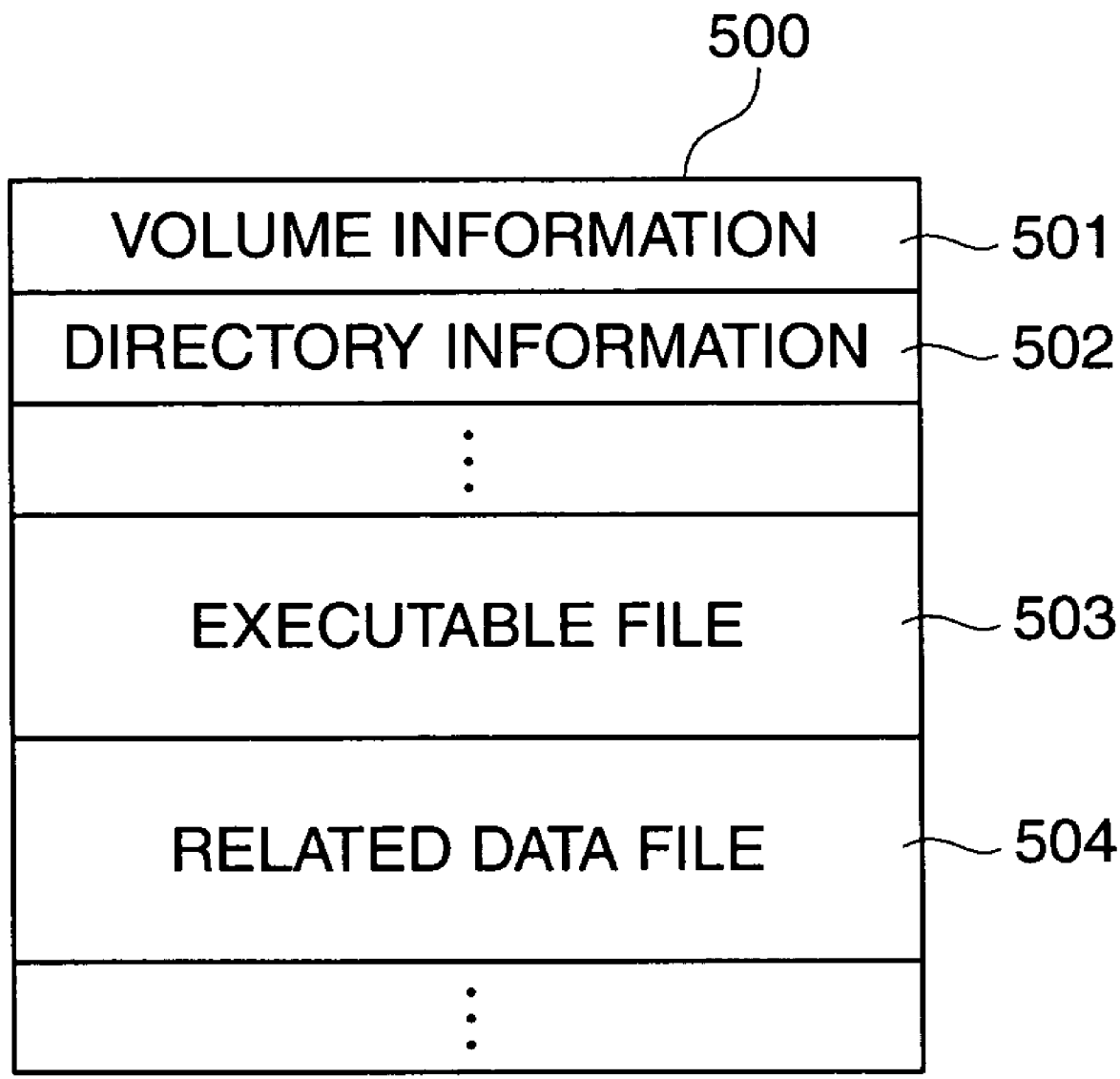
FIG. 6 is a diagram showing the structure of an application and related data in FIG. 5.

FIG. 6 is a diagram showing the structure of the application 403 and the related data 404 shown in FIG. 5.

As shown in FIG. 6, the Floppy Disk (registered trademark) FD has a recording area 500 in which are recorded volume information 501, directory information 502, an executable file 503, and a related data file 504.

Figure 7:
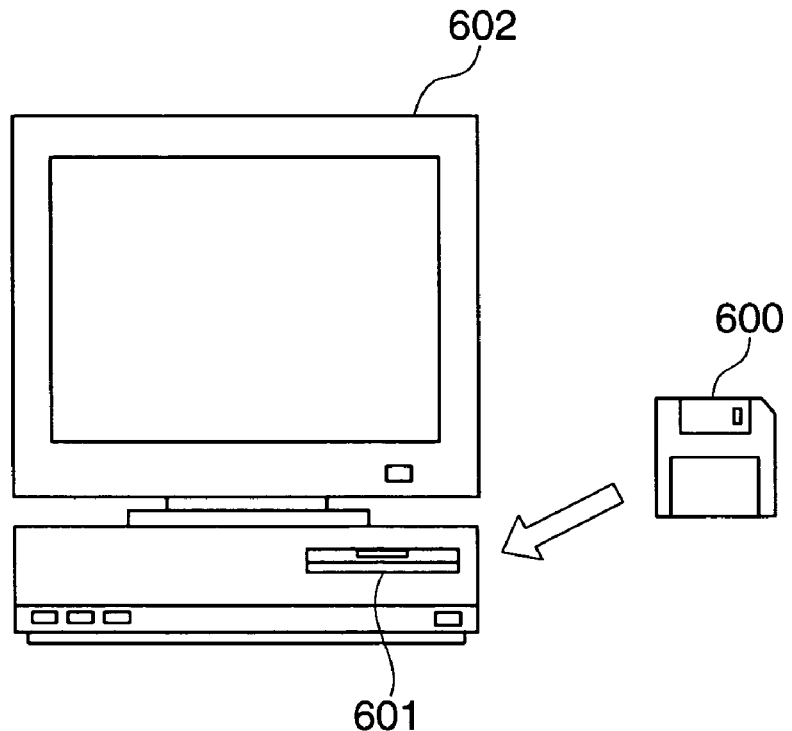
FIG. 7 is a diagram which is useful in explaining a method of loading the application and the related data in FIG. 5 into a computer system.

As shown in FIG. 7, the application 403 and the related data 404 recorded onto a Floppy Disk (registered trademark). FD 600 can be load into a computer system 602 through a Floppy Disk (registered trademark) drive DKC 601. When the FD 600 is set in the DKC 601, the executable file 503 is executed under the control of the OS 402 and the basic I/O program 401, to read out the main job account program and the related data are thereby read out from the FD 600 and loaded into the RAM 203, so that the program can become executable. The storage medium is not limited to a Floppy Disk (registered trademark) but DVD, CD-ROM, or the like can also be used.

Figure 8:
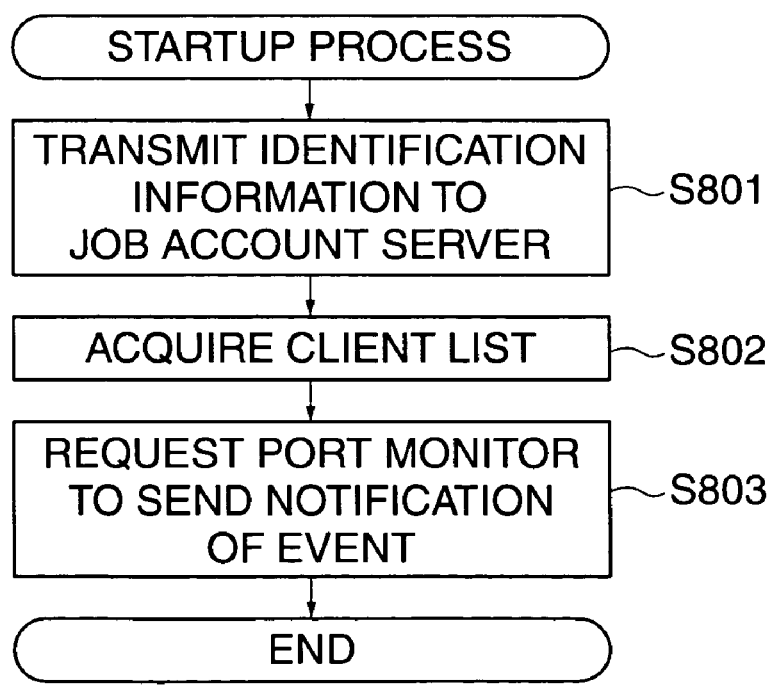
FIG. 8 is a flowchart showing a startup process that is executed by the job account client application in FIG. 1.

FIG. 8 is a flowchart showing a startup process executed by a job account client application 131 appearing in FIG. 1.

As shown in FIG. 8, the job account client application 131 transmits identification information on the print server 130 to the job account server application 141 (step S801). The identification information that is transmitted includes, for example, a computer name, an IP address, a version of the job account client application 131. The job account server application 141 holds the transmitted identification information.

Then, a client list is acquired from the job account server application 141 (step S802). The client list is a list of computers in which are installed previously registered job account client applications, and as shown in FIG. 9, information such as, a computer name, IP address, and a job account client application version of the print client.

In the following step S803, a request is sent to the port monitor 137 so that the latter sends a notification of an event when a job is received, and then the process is terminated. According to this, when the port monitor 137 receives job data, the job account client application 131 is notified to that effect, and execution of a printing process is suspended until a response is received from the application 131.

According to the process in FIG. 8, the job account client application 131 obtains the client list from the job account server application 141 (step S802). As a result, it is possible to easily determine whether or not a job account client application is installed in the print client.

Figure 10:
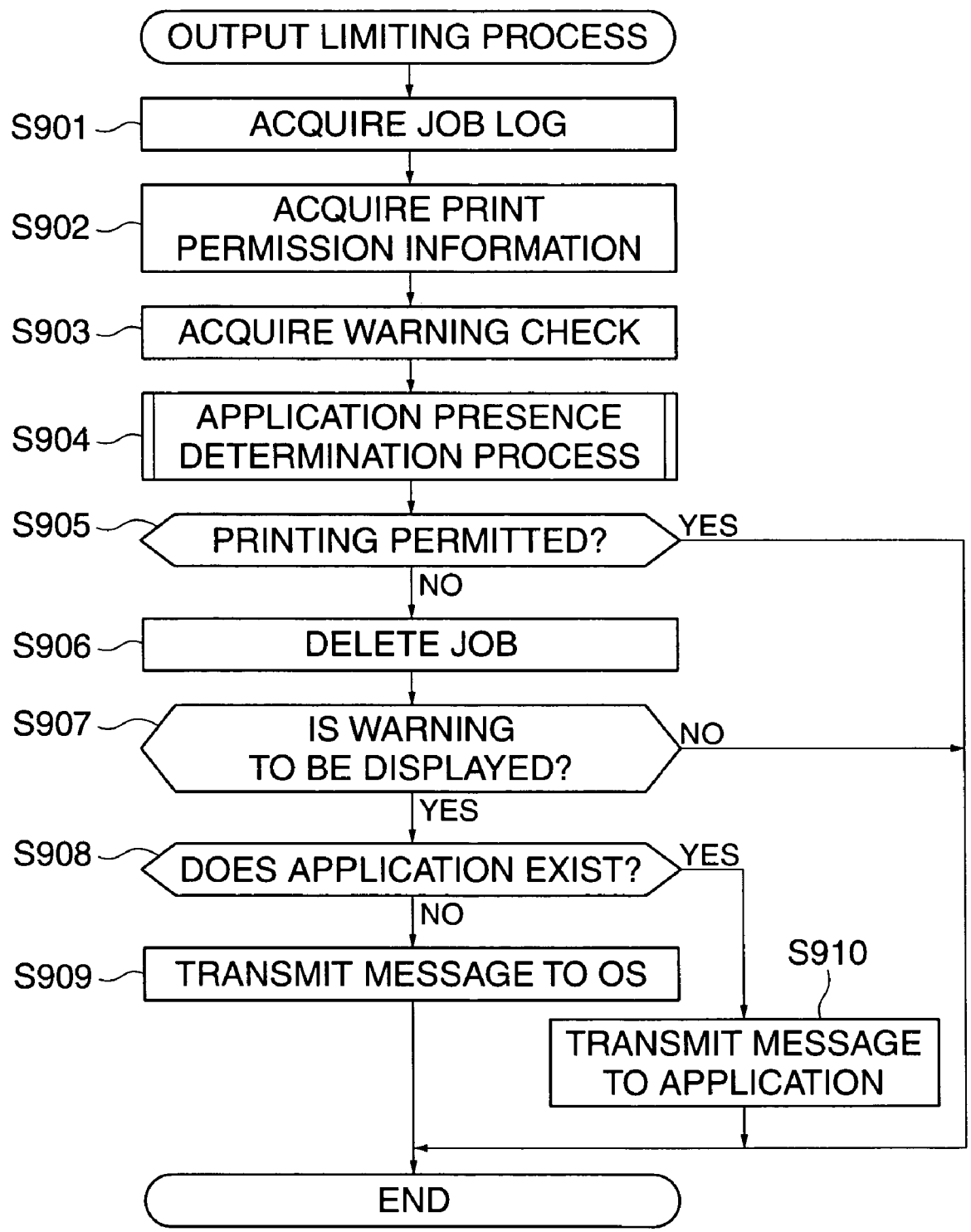
FIG. 10 is a flowchart showing an output limiting process executed by the job account client application in FIG. 1.

FIG. 10 is a flowchart showing an output limiting process executed by the job account client application 131 in FIG. 1.

As shown in FIG. 10, the job account client application 131 acquires a job log from the port monitor 137 when the port monitor 137 receives data (step S901). The contents of the job log are basically the same as the port monitor log in FIG. 2, but differ in that information is not yet determined because the execution of the job is not complete.

Then, through the communication with the job account server application 141, the job account client application 131 acquires printing permission information as to whether printing can be carried out based on the job, which is determined based on output limitation information (FIG. 11) set by the job account server application 141 (step S902). Then, information as to whether or not a warning should be displayed is acquired from the output limitation information (step S903), and an application presence determination process of FIG. 12, described hereinafter, is executed to acquire application presence/absence information as to the presence of a job account client application in the computer that instructed printing (step S904).

After this, it is determined whether or not printing can be carried out, based on the printing permission information (step S905). When printing can be carried out, the process is immediately terminated, whereas, when printing cannot be carried out, the printing process is suspended with the job cancelled (step S906), followed by determining whether or not a warning should be displayed (step S907). When a warning should not be displayed, the process is immediately terminated, whereas, when a warning should be displayed, it is determined whether or not the job account client application exists in the computer that instructed printing, based on the application presence/absence information (step S908).

When it is determined in the step S908 that the job account client application is absent in the computer that instructed printing, the job account client application 131 sends a message to the OS of the computer (step S909), and then terminates the process. In this case, the computer that instructed printing notifies the OS of the message by a standard method stipulated by the OS. For example, when printing is instructed by the print client B 120, the message service 121 receives the message from the print server 130, and delivers the message to the user through dialog display.

On the other hand, when it is determined in the step S908 that the job account client application is present in the computer that instructed printing, the job account client application 131 sends a message to the job account client application (step S910), and then terminates the process. For example, when printing is instructed by the print client A 110, the message is sent to the job account client application 111. As the method of sending the message, the TCP/IP protocol including a predetermined port of the job account client application can be used, for example. The job account client application having received the message then transmits the message to the user through dialog display, outputting a sound, or the like.

Compared to the standard method stipulated by the OS, the message notification method peculiar to the job account client application has a larger degree of freedom, and can be customized such that sound is output, display time is lengthened, or the number of times of display is increased.

According to the process in FIG. 10, when the job account client application is absent in a computer that instructed printing, the job account client application 131 transmits a message by the standard method stipulated by the OS of the printing computer (step S909). As a result, a message can be displayed without installing a job account client application in the print client.

FIG. 11 is a diagram showing a user interface (UI) for setting output limitation information in the job account server application 141 in FIG. 1.

After specifying a user by some means, output limitation information is set for the specified user. In the present embodiment, the owner name is allotted to a key for specifying the user.

As shown in FIG. 11, the UI is comprised of a unit period input field 1101 for inputting a unit period for which an upper limit of printing amount is to be set, a start date input field 1102 for inputting the start date and time of the unit period, an upper limit input field 1103 for inputting the upper limit of printing amount for the unit period, a deletion selection field 1104 for selecting whether or not to delete a job after the upper limit has been exceeded, and a warning selection field 1105 for selecting whether or not to give a warning after the upper limit has been exceeded. When the unit period has elapsed, then the result value, that is, the actually printed amount, is reset to zero.

Moreover, in the upper limit input field 1103, the upper limit unit is set to "side", but it may be a number of sheets, or the upper limit may be indicated in terms of cost converted from, for example, a number of sides or a color mode. When "YES" is selected in the deletion selection field 1104, remaining jobs can no longer be printed once the upper limit has been exceeded.

Further, the UI further includes a character string display field 1106 that displays character strings upon which limitations are to be imposed, an add button 1107 for adding character strings to the character string display field 1106, a delete button 1108 for selecting and deleting a character string from ones shown in the character string display field 1106, a deletion selection field 1109 for selecting whether or not to delete a job with a document name including a limitation-imposing character string, and a warning selection field 1110 for selecting whether or not to give a warning regarding a job with a document name including a limitation-imposing character string.

If a limitation-imposing character string is included in the document name of a job, a limitation is imposed upon printing of the job.

Furthermore, the UI also includes an OK button 1111 that is pressed to save the current edited contents, a cancel button 1112 that is pressed to terminate the dialog without saving the current settings.

In the steps S902 and S903 of FIG. 10, upon acquiring the printing permission information and information as to whether or not a warning is to be displayed, the job account server application 141 specifies a user from the owner name of the job log. Then, the job account server application 141 determines whether the output amount of the user per the unit period exceeds the upper limit, whether the document name contains one or more limitation-imposing character strings, whether it is set that the job is to be deleted, and whether it is set that a warning is to given regarding the job, and returns the results of the determinations to the job account client application 131.

Figure 12:
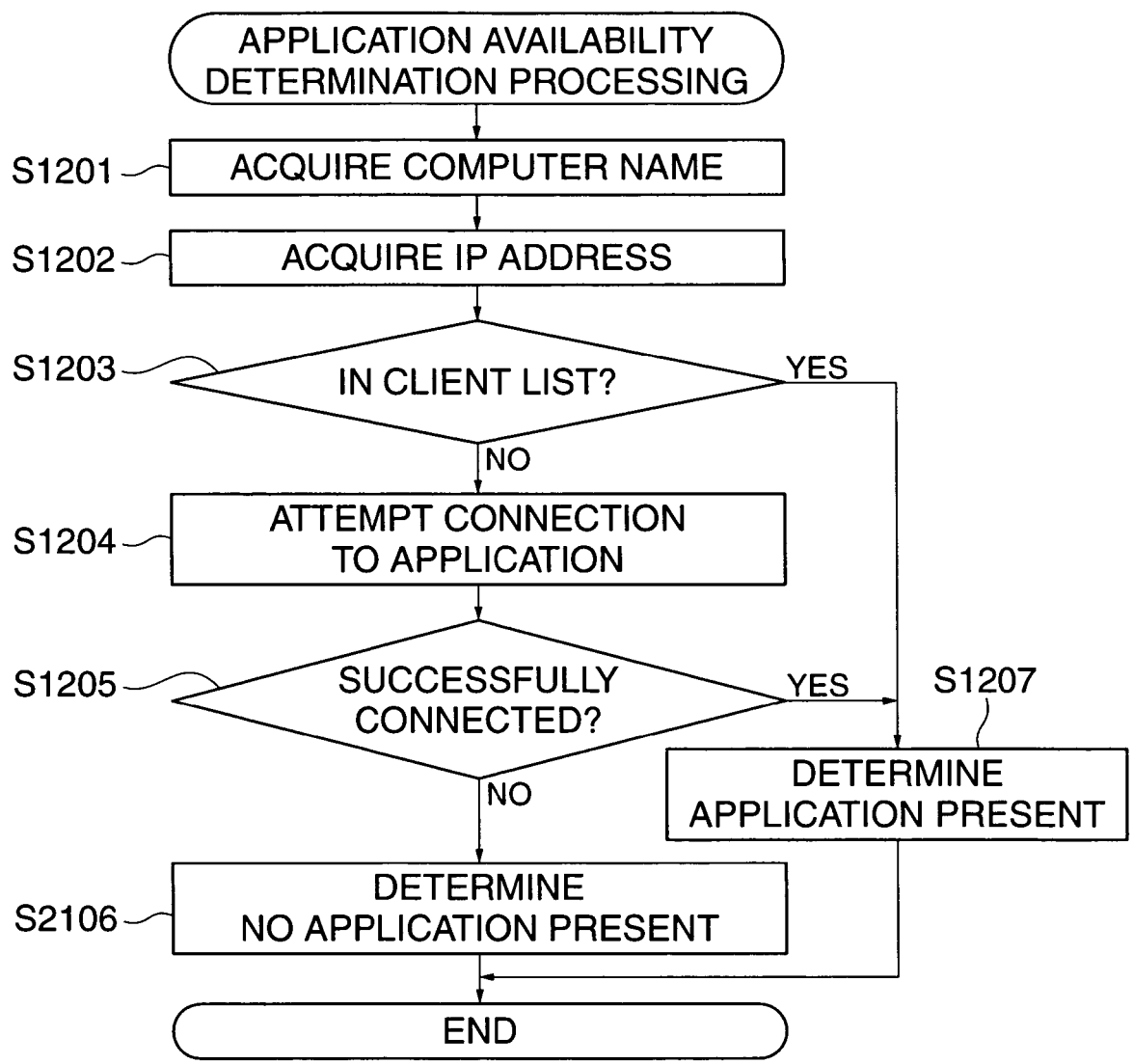
FIG. 12 is a flowchart of an application presence determination process executed in a step S904 in FIG. 10.
Figure 13:
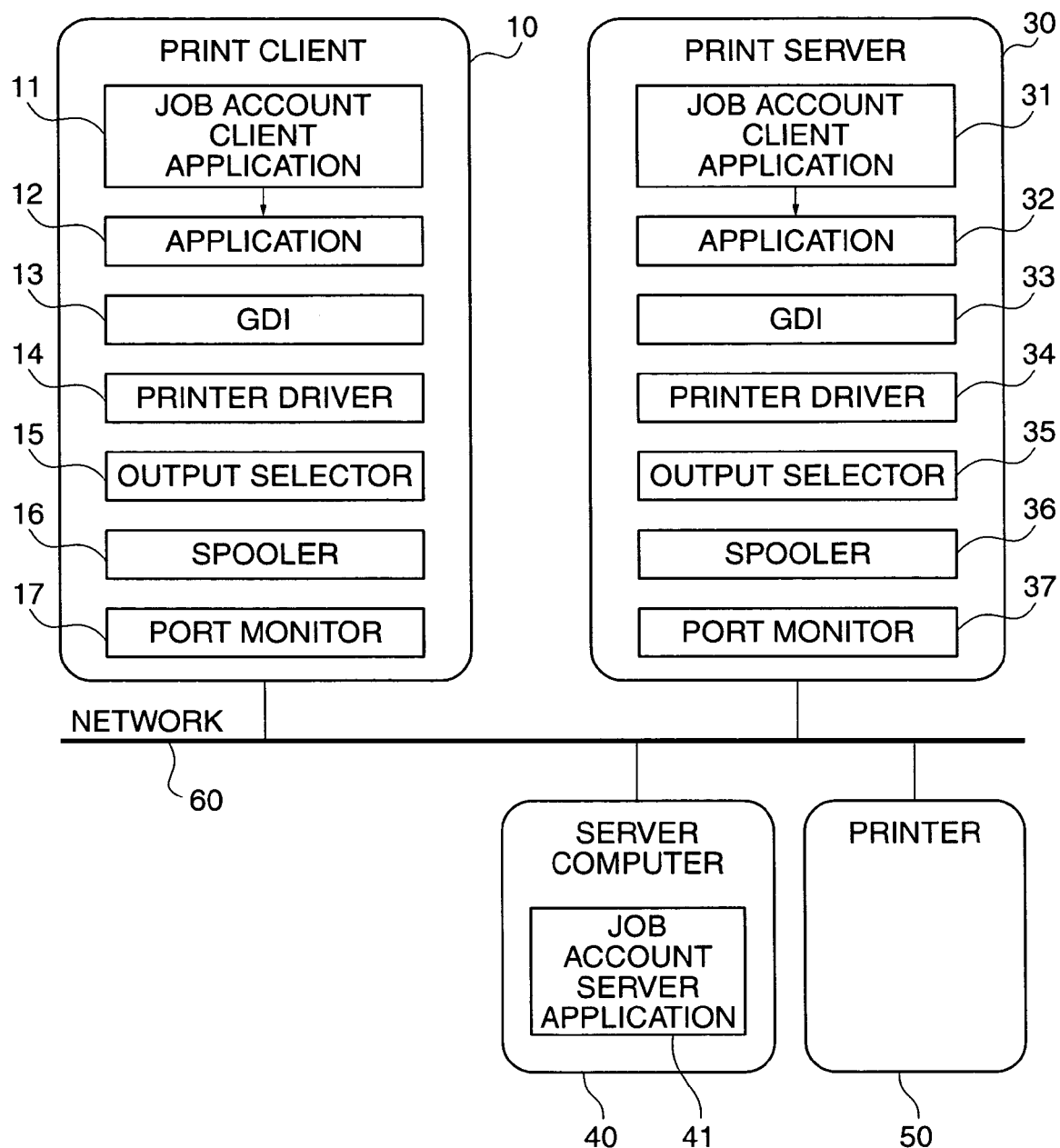
FIG. 13 is a block diagram schematically showing the construction of a conventional job managing system.

FIG. 12 is a flowchart showing the application presence determination process in the step S904 in FIG. 10.

As shown in FIG. 12, the job account client application 131 acquires the computer name of the print client of the job (step S1201), acquires an IP address from the acquired computer name (step S1202), determines whether or not there is the acquired IP address in the client list (FIG. 9) (step S1203). When there is the acquired IP address, the job account client application 131 determines that the print client has a job account client application (step S1207), followed by the process being terminated.

When it is determined in the step S1203 that there is no acquired IP address in the client list, the job account client application 131 attempts to connect to a communication port that should be included in a print client job account client application if the latter is possessed by the print client (step S1204). Then, the job account client application 131 determines whether or not the connection to the job account client application has been successful (step S1205). If it has been successful, the job account client application 131 determines that the print client has a job account client application (step S1207). On the other hand, if the connection to the job account client application has been unsuccessful, the job account client application 131 determines that the print client has no job account client application (step S1206), followed by the process being terminated.

According to the process of FIG. 12, when there is an acquired IP address is contained in the client list, it is determined that the print client has a job account client application (step S1207). As a result, it is possible to easily determine whether a job account client application is installed in the print client, by referring to the client list.

Further, when the connection to the job account client application has been successful, it is determined that the print client has a job account client application (step S1207). As a result, it is possible to reliably determine whether a job account client application is installed in the print client.

Furthermore, a printer (peripheral device) that can be applied to the job managing system may have a print server (job managing apparatus) incorporated therein.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-100618 filed Mar. 30, 2004, which is hereby incorporated by reference herein.

What is claimed is:

1. A job managing apparatus that manages a job that is output to a peripheral device via a communication medium and transmits information related to the job to an information processing apparatus, comprising:
    a connecting unit that is connectable to a job management application in the information processing apparatus for notifying a user of the information related to the job;
    a determining unit that determines whether or not the information processing apparatus has the job management application, wherein the determination by said determining unit is made by determining whether or not said connecting unit connects to the job management application in the information processing apparatus; and
    a transmission unit that transmits the information related to the job to the job management application so as to cause the information processing apparatus to notify the user of the information by a first method peculiar to the job management application when it is determined by said determining unit that the information processing apparatus has the job management application, while transmitting the information related to the job to a message service of the information processing apparatus so as to cause the information processing apparatus to notify the user of the information by a second method stipulated as a standard method by an operating system of the information processing apparatus when it is determined by said determining unit that the information processing apparatus does not have the job management application.

2. A job managing apparatus according to claim 1, further comprising a setting unit that sets an upper limit of an output amount of the job output by the peripheral device, and a limiting unit that limits the peripheral device from outputting over the upper limit of the output amount.

3. A job managing apparatus according to claim 2, wherein the upper limit of the output amount includes at least one of upper limit values per unit period relating to number of pages, number of sides, and charges.

4. A job managing apparatus according to claim 2, further comprising a third setting unit that sets whether or not the job, output of which is to be limited, is to be deleted.

5. A job managing apparatus according to claim 2, further comprising a fourth setting unit that sets whether or not a warning is to be given regarding the job, output of which is to be limited.

6. A job managing apparatus according to claim 1, further comprising a second setting unit that sets at least one attribute of the job, and a second limiting unit that limits output of a job having the attribute.

7. A job managing apparatus according to claim 6, wherein the attribute comprises at least one specific character string contained in a document name of the job.

8. The job managing apparatus according to claim 1, further comprising a registering unit that registers in a list the information processing apparatus having the job management application,
wherein when the information processing apparatus has been registered in the list, the transmission unit transmits, by the first method, the information related to the job to the job managing application of the information processing apparatus without causing the determination by said determining unit to be made.

9. The job managing apparatus according to claim 1, wherein the first method notifies the information in a different manner from the second method.

10. A job managing method of managing a job that is output to a peripheral device via a communication medium, and transmitting information related to the job to an information processing apparatus, comprising:
attempting, with a connecting unit, to connect to a job management application in the information processing apparatus in order to notify a user of the information related to the job;
determining, with a determination unit, whether or not the information processing apparatus has the job management application, wherein the determination by said determining unit is made by determining whether or not said connecting unit connects to the job management application in the information processing apparatus;
transmitting, with a transmission unit, the information related to the job to the job management application so as to cause the information processing apparatus to notify the user of the information by a first method peculiar to the job management application when it is determined by said determining unit that the information processing apparatus has the job management application, while transmitting, with the transmission unit, the information related to the job to a message service of an operating system of the information processing apparatus so as to cause the information processing apparatus to notify the user of the information by a second method stipulated as a standard method by an operating system of the information processing apparatus when it is determined by said determining unit that the information processing apparatus does not have the job management application.

11. The job managing method according to claim 10, further comprising registering in a list the information processing apparatus having the job management application,
wherein when the information processing apparatus has been registered in the list, the method further comprises transmitting, with the transmission unit and by the first method, the information related to the job to the job managing application of the information processing apparatus without causing the determination by said determining unit to be made.

12. The job managing method according to claim 10, wherein the first method notifies the information in a different manner from the second method.

13. A computer readable storage medium that stores a job managing program that is executable by a computer to manage a job that is output to a peripheral device via a communication medium and transmit information related to the job to an information processing apparatus, the program comprising:

a connecting module that attempts to connect to a job management application in the information processing apparatus for notifying a user of the information related to the job;
a determining module for determining whether or not the information processing apparatus has the job management application, wherein the determination by said determining module is made by determining whether or not said connecting module connects to the job management application in the information processing apparatus;
a transmission module for transmitting the information related to the job to the job management application so as to cause the information processing apparatus to notify the user of the information by a first method peculiar to the job management application when it is determined by said determining module that the information processing apparatus has the job management application, while transmitting the information related to the job to a message service of operating system of the information processing apparatus so as to cause the information processing apparatus to notify the user of the information by a second method stipulated as a standard method by an operating system of the information processing apparatus when it is determined by said determining module that the information processing apparatus does not have the job management application.

14. A computer readable storage medium according to claim 13, further comprising a setting module for setting an upper limit of an output amount of the job output by the peripheral device, and a limiting module for limiting the peripheral device from outputting over the upper limit of the output amount.

15. A computer readable storage medium according to claim 14, wherein the upper limit of the output amount includes at least one of upper limit values per unit period relating to number of pages, number of sides, and charges.

16. A computer readable storage medium according to claim 14, further comprising a third setting module for setting whether or not the job, output of which is to be limited, is to be deleted.

17. A computer readable storage medium according to claim 14, further comprising a fourth setting module for setting whether or not a warning is to be given regarding the job, output of which is to be limited.

18. A computer readable storage medium according to claim 13, further comprising a second setting module for setting at least one attribute of the job, and a second limiting module for limiting output of a job having the attribute.

19. A computer readable storage medium according to claim 18, wherein the attribute comprises at least one specific character string contained in a document name of the job.

20. The computer readable storage medium according to claim 13, the program further comprising a registering module that registers in a list the information processing apparatus having the job management application,
wherein when the information processing apparatus has been registered in the list, the transmission module for transmitting, by the first method, the information related to the job to the job managing application of the information processing apparatus without causing the determination by said determining module to be made.

21. The computer readable storage medium according to claim 13, wherein the first method notifies the information in a different manner from the second method.

22. A job managing system comprising:

an information processing apparatus that notifies a user of information; and a job managing apparatus that manages a job that is output to a peripheral device via a communication medium and transmits information related to the job to the information processing apparatus;

wherein said job managing apparatus includes:

a connecting unit that is connectable to a job management application in the information processing apparatus for notifying a user of the information related to the job;

a determining unit that determines whether or not the information processing apparatus has the job management application, wherein the determination by said determining unit is made by determining whether or not said connecting unit connects to the job management application in the information processing apparatus; and a transmission unit that transmits the information related to the job to the job management application so as to cause the information processing apparatus to notify the user of the information by a first method peculiar to the job management application when it is determined by said determining unit that the information processing apparatus has the job management application, while transmitting the information related to the job to a message service of an operating system of the information processing apparatus so as to cause the information processing apparatus to notify the user of the information by a second method stipulated as a standard method by an operating system of the information processing apparatus when it is determined by said determining unit that the information processing apparatus does not have the job management application.

23. The job managing system according to claim 22, wherein the job managing apparatus further comprises a registering unit that registers in a list the information processing apparatus having the job management application, wherein when the information processing apparatus has been registered in the list, the transmission unit transmits, by the first method, the information related to the job to the job managing application of the information processing apparatus without causing the determination by said determining unit to be made.

24. The job managing system according to claim 22, wherein the first method notifies the information in a different manner from the second method.

* * * * *